UNITED STATES PATENT OFFICE.

JOHN QUINCEY MAULE, OF TERRELL, TEXAS.

BOILER COMPOUND.

976,894.

Specification of Letters Patent.  Patented Nov. 29, 1910.

No Drawing.   Application filed January 14, 1910.   Serial No. 538,141.

*To all whom it may concern:*

Be it known that I, JOHN QUINCEY MAULE, a citizen of the United States, residing at Terrell, in the county of Kaufman and State of Texas, have invented certain new and useful Improvements in Boiler Compounds, of which the following is a specification.

My composition consists of the following ingredients combined in the proportions stated, namely,

| | |
|---|---|
| Castor oil, | 19 gallons, |
| Crude petroleum, | 19 gallons, |
| Molasses, | 2 gallons, |

These ingredients are to be thoroughly mingled by agitation.

My composition is designed to be used primarily for softening and purifying water in steam boilers. It is well known that it is extremely difficult to raise steam in boilers where necessity compels the use of Artesian water, or water in which various minerals are present in large percentages. The same difficulty is encountered when the water is dirty or muddy; and in localities where clear, soft water is unobtainable, and Artesian or muddy water is of necessity employed in steam boilers, the difficulty of raising steam is always present, and the presence of sand and other particles, when muddy water is used, also works injury to the valves, steam cylinders, and other parts of the engine. Also, from the causes above mentioned, great loss of time and speed of the engine is occasioned.

By the use of the above composition, which is introduced into the boiler in the proportions specified, the water in the boiler is speedily and thoroughly cleansed and purified, and all sand and sediment is precipitated to the bottom, and the water is softened so that steam may be quickly raised.

What I claim, is:

1. The herein described composition of matter, consisting of castor oil, crude petroleum and molasses, substantially as described, and for the purposes specified.

2. The herein described composition of matter, for softening and purifying water for steam boilers, consisting of castor oil, 19 gallons, crude petroleum, 19 gallons, and molasses, 2 gallons.

3. The herein described composition of matter for cleansing, purifying and softening water and precipitating sediment therein for steam boilers, consisting of castor oil, crude petroleum and molasses, substantially as described and for the purpose specified.

4. The herein described composition of matter for cleansing, purifying and softening water for steam boilers, consisting of castor oil, 19 gallons, crude petroleum, 19 gallons, molasses 2 gallons, substantially as described and for the purposes specified.

In testimony whereof I have signed my name to this specification in the presence of two subscribing witnesses.

JOHN QUINCEY MAULE.

Witnesses:
EUGENIA HENSLEY,
J. S. MURRAY.